United States Patent
Hwang et al.

(10) Patent No.: US 7,881,182 B2
(45) Date of Patent: Feb. 1, 2011

(54) APPARATUS AND METHOD FOR CONTROLLING RANGING OF MOBILE TERMINALS IN WIRELESS COMMUNICATION SYSTEM

(75) Inventors: Yong-Suk Hwang, Yongin-si (KR); Jae-Hyeong Kim, Seoul (KR)

(73) Assignee: Seah Networks Co., Ltd., Seoul (KR)

( * ) Notice: Subject to any disclaimer, the term of this patent is extended or adjusted under 35 U.S.C. 154(b) by 408 days.

(21) Appl. No.: 12/158,303

(22) PCT Filed: Dec. 28, 2006

(86) PCT No.: PCT/KR2006/005797
§ 371 (c)(1),
(2), (4) Date: Jun. 19, 2008

(87) PCT Pub. No.: WO2007/078097
PCT Pub. Date: Jul. 12, 2007

(65) Prior Publication Data
US 2009/0252028 A1    Oct. 8, 2009

(30) Foreign Application Priority Data
Dec. 30, 2005 (KR) .................. 10-2005-0135542

(51) Int. Cl.
*H04B 7/26* (2006.01)
(52) U.S. Cl. ............... 370/208; 370/350; 370/500
(58) Field of Classification Search .............. 370/208, 370/350, 500
See application file for complete search history.

(56) References Cited

U.S. PATENT DOCUMENTS

| | | | |
|---|---|---|---|
| 2003/0198179 A1 | 10/2003 | Koo et al. | |
| 2005/0117539 A1 | 6/2005 | Song et al. | |
| 2005/0135230 A1 | 6/2005 | Yu et al. | |
| 2005/0197171 A1 | 9/2005 | Son et al. | |
| 2005/0266896 A1 | 12/2005 | Son et al. | |
| 2007/0058524 A1* | 3/2007 | Modlin et al. | 370/208 |
| 2009/0268710 A1* | 10/2009 | Yu et al. | 370/350 |
| 2010/0074105 A1* | 3/2010 | Periyalwar et al. | 370/228 |

OTHER PUBLICATIONS

Korean Intellectual Property Office, International Search Report for International Application No. PCT/KR2006/005797, 3 pages (Date completed: Apr. 27, 2007).

* cited by examiner

*Primary Examiner*—Melvin Marcelo

(57) ABSTRACT

Disclosed are an apparatus and a method for controlling ranging in a wireless communication system. The apparatus according to the present invention comprises a Radio Frequency (RF) module converting RF band signals received via antenna to low-frequency band signal; a Fast Fourier Transform (FFT) module converting the low-frequency band signal of time-domain to frequency-domain signal; a derandomizer performing derandomizing the frequency-domain signals by using a random sequence being transmitted by the terminals; a depermutation module combining the frequency-domain signals output from the derandomizer by unit of burst and outputting the combined signal; and a ranging controller controlling periodic ranging of the terminal corresponding to the respective bursts by estimating phase change in the frequency-domain signals of burst unit.

20 Claims, 2 Drawing Sheets

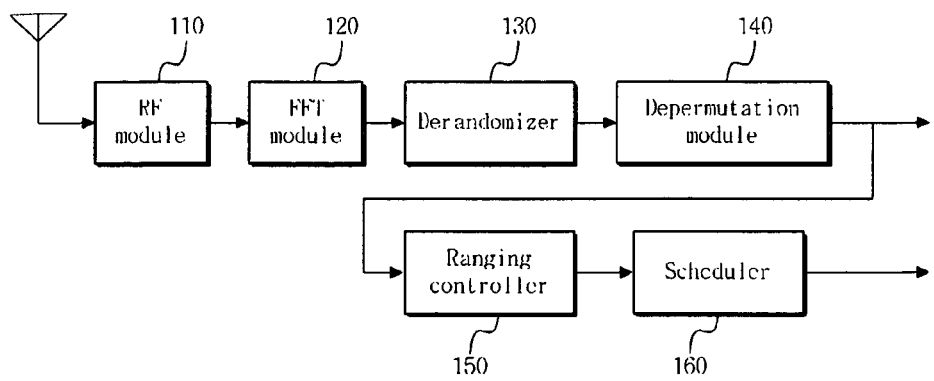
[Fig. 1]
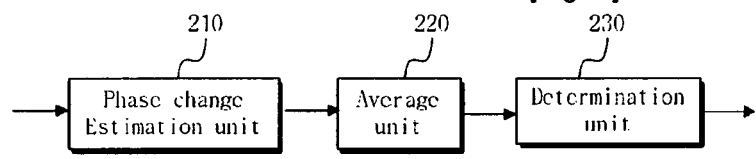
[Fig. 2]
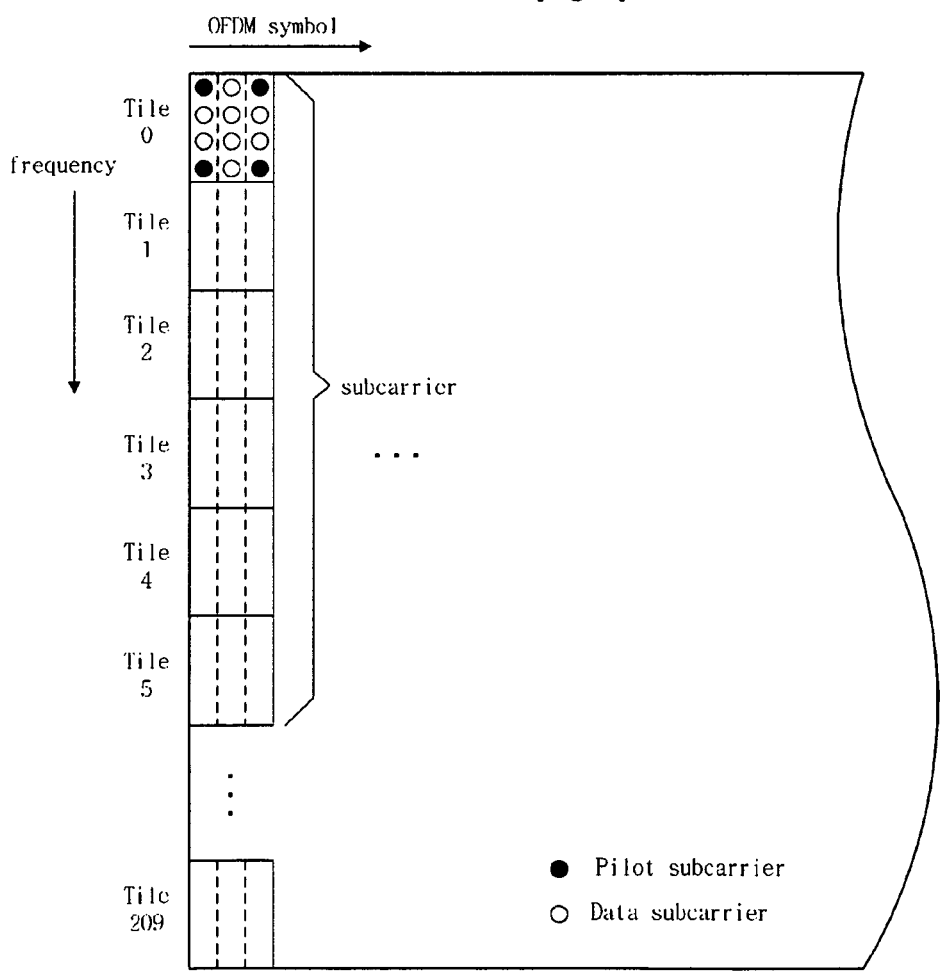
[Fig. 3]

[Fig. 4]
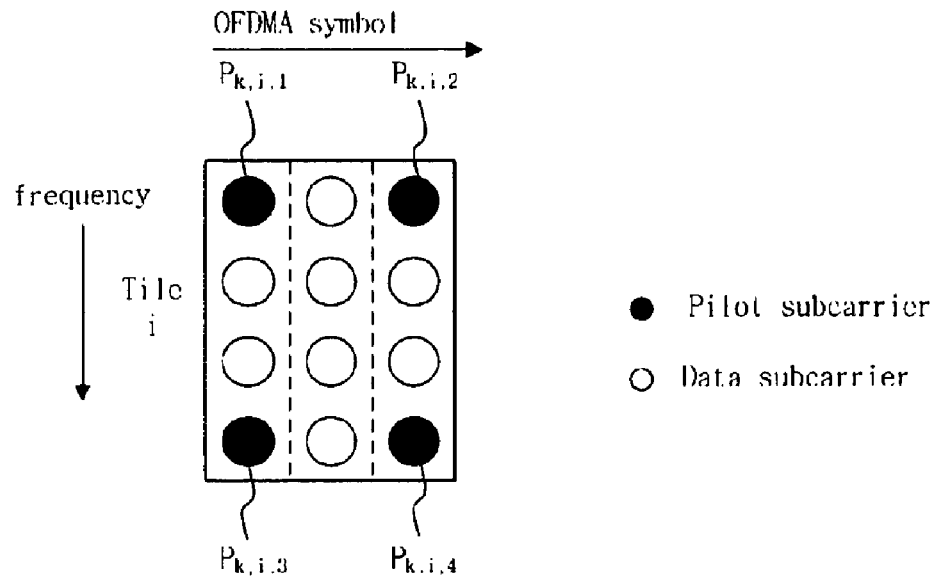
[Fig. 5]
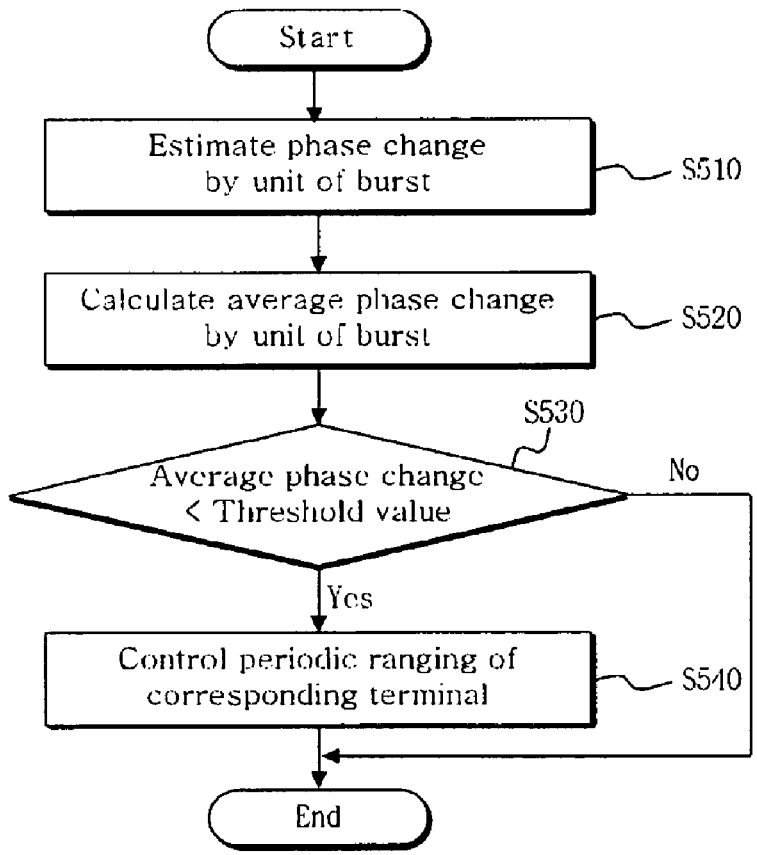

APPARATUS AND METHOD FOR CONTROLLING RANGING OF MOBILE TERMINALS IN WIRELESS COMMUNICATION SYSTEM

CROSS REFERENCE TO RELATED APPLICATIONS

This application is a US National Stage of International Patent Application No. PCT/KR2006/005797, filed Dec. 28, 2006, which in turn claims the benefit of Korean Patent Application No. 10-2005-0135542, filed Dec. 30, 2005, the disclosures of both applications are incorporated herein by reference.

TECHNICAL FIELD

The present invention relates to an apparatus and a method for controlling a ranging of mobile terminals in a wireless communication system, and more particularly to an apparatus and a method for controlling the ranging of mobile terminals by a base station in case periodic ranging is not performed by the terminal.

BACKGROUND ART

An Institute of Electrical and Electronics Engineers (IEEE) 802.16e communication system performs communication through ranging between a terminal and a base station, considering mobility of the terminal, whereas an IEEE 802.16a communication system does not consider mobility of a subscriber.

The ranging can be classified into an initial ranging, a bandwidth request ranging, and a periodic ranging according to the purpose. The initial ranging is performed to obtain synchronization between the base station and the terminal. More specifically, the initial ranging sets correct time and frequency offset between the base station and the terminal, and adjusts transmission power. The periodic ranging is periodically performed by the terminal in which the time offset and the transmission power is set through the initial ranging with respect to the base station, in order to readjust the time offset and the transmission power according to the channel state. The bandwidth request ranging is performed to request allocation of the bandwidth so that the terminal set in the time offset and the transmission power can perform actual communication with the base station.

When the terminal has no data to be transmitted on the uplink channel for a while, the periodic ranging is determined and performed.

However, when data is being continuously transmitted on the uplink channel, the terminal does not perform the periodic ranging. When such a state is continued and furthermore the terminal approaches the base station from a distance, transmission delay is reduced and the data is received to the base station faster than expected. In this case, a signal distortion may be incurred.

DISCLOSURE OF INVENTION

Technical Problem

The present invention has been made in view of the above-mentioned problems, and it is an object of the present invention to provide an apparatus and a method for controlling ranging that adjusts transmission timing of uplink signals in a wireless communication system.

It is another object of the present invention to provide an apparatus and a method for controlling ranging that adjusts transmission timing of an uplink signals in a communication system supporting Orthogonal Frequency Division Multiplexing/Orthogonal Frequency Division Multiplexing Access (OFDM/OFDMA).

It is yet another object of the present invention to provide an apparatus and a method for controlling ranging that adjusts transmission timing of an uplink signal in a communication system supporting Institute of Electrical and Electronics Engineers (IEEE) 802.16d/e standard.

It is yet another object of the present invention to provide an apparatus and a method for controlling ranging transmission time of an uplink in a communication system supporting Wireless Broadband Internet/Worldwide Interoperability for Microwave Access (WiBro/WiMAX).

It is yet another object of the present invention to provide an apparatus and a method for controlling periodic ranging.

It is yet another object of the present invention to provide an apparatus and a method for controlling initiation of the periodic ranging in a wireless communication system.

It is yet another object of the present invention to provide an apparatus and a method for controlling ranging that adjusts transmission timing of an uplink signal by estimating phase change in a wireless communication system.

Technical Solution

According to an aspect of the present invention, there is provided an apparatus for controlling ranging of a terminal in a wireless communication system, comprising a Radio Frequency (RF) module for converting RF band signal received via antenna to low-frequency band signal; a Fast Fourier Transform (FFT) module for converting the time-domain low-frequency band signal to a frequency-domain signal; a derandomizer for offsetting a random number included in the signal being transmitted by the terminal, with respect to the frequency-domain signal; a depermutation module for combining the frequency-domain signal output from the derandomizer by unit of burst and outputting the combined signals; and a ranging controller for controlling periodic ranging of the terminals corresponding to the respective bursts by estimating phase change in the frequency-domain signal of burst unit.

The ranging controller controls the periodic ranging of the terminal corresponding to the burst, by estimating phase change of pilots included in the frequency-domain signal of burst unit, by unit of burst, averaging the estimated phase changes, and comparing the average phase change with a threshold value for determining the periodic ranging of the terminal.

A method for controlling ranging of a terminal in a wireless communication system, according to the present invention, comprises steps of receiving signal from a plurality of terminals and converting the received RF band signal to low-frequency band signal; converting the time-domain signal of the low frequency band to frequency-domain signal; offsetting a random number included in signal being transmitted by the terminal, with respect to the frequency-domain signal; combining the frequency-domain signal in which the random number is offset, by unit of burst; and controlling periodic ranging of the terminal corresponding to the respective burst by estimating phase change in the frequency-domain signals of burst unit.

The controlling step comprises steps of estimating the phase change of pilots included in the frequency-domain signal of burst unit; averaging the estimated phase change;

and controlling periodic ranging of the terminal corresponding to the burst by comparing the average phase change with a threshold value for determining the periodic ranging.

ADVANTAGEOUS EFFECTS

According to the present invention, a time delay of the signal can be predicted in a base station by estimating phase change using the signal received from a terminal. Since periodic ranging of the terminal is controlled using the predicted delay, transmission timing of the terminal can be adjusted.

Since the periodic ranging of the terminal is controlled by the base station, signal distortion due to the time delay can be prevented.

In a communication system supporting Orthogonal Frequency Division Multiplexing/Orthogonal Frequency Division Multiplexing Access (OFDM/OFDMA), the transmission timing of the uplink signal is adjusted by predicting the time delay of the signal based on the phase change of pilots and controlling the periodic ranging.

Also, in a communication system supporting Institute of Electrical and Electronics Engineers (IEEE) 802.16d/e standard, the transmission timing of the uplink signal is adjusted by predicting the time delay of the signal based on the phase change of pilots and controlling the periodic ranging. Accordingly, the signal distortion can be prevented.

In addition, in a communication system supporting Wireless Broadband Internet/Worldwide Interoperability for Microwave Access (Wibro/WiMAX), the transmission timing of the uplink signals is adjusted by predicting the time delay of the signal based on the phase change of pilots and controlling the periodic ranging. Accordingly, the signal distortion can be prevented.

BRIEF DESCRIPTION OF THE DRAWINGS

The foregoing and other objects, features and advantages of the present invention will become more apparent from the following detailed description when taken in conjunction with the accompanying drawings in which:

FIG. 1 is a view showing the structure of a base station in a wireless communication system, according to an embodiment of the present invention;

FIG. 2 is a view showing the structure of a periodic ranging controlling apparatus of a terminal according to an embodiment of the present invention;

FIG. 3 is a view showing the structure of a transmission signal when the communication system uses a Partial Usage of Sub-Channels (PUSC) mode for an uplink channel;

FIG. 4 is a detailed view of a tile of the transmission signal when the communication system uses the PUSC mode for an uplink channel; and FIG. 5 is a flowchart illustrating a method for controlling periodic ranging of the terminal according to an embodiment of the present invention.

MODE FOR THE INVENTION

Hereinafter, an exemplary embodiment of the present invention will be described in detail with reference to the accompanying drawings. Well known functions and constructions are not described in detail since they would obscure the invention in unnecessary detail.

In a wireless communication system applying the present invention, a terminal being allocated with an uplink channel transmits data to a base station. Then, the base station receives signals of burst unit transmitted from a plurality of terminals.

Referring to FIG. 1, the base station comprises a Radio Frequency (RF) module 110, a Fast Fourier Transform (FFT) module 120, a derandomizer 130, a depermutation module 140, ranging controller 150 and a scheduler 160. The ranging controller 150, in connection with the output of the depermutation module 140, controls the ranging operation of the terminal using an output signal from the depermutation module 140. The scheduler 160 is connected to the ranging controller 150, and instructs the terminal to initiate the periodic ranging by transmitting a Ranging Responding (RNG-RSP) message to the base station, based on the ranging control signal from the ranging controller 150.

The RF module 110 converts an RF band signal received via antenna to a low-frequency band signal. The FFT module 120 converts a low-frequency band signal of time-domain to a frequency-domain signal. The derandomizer 130 offsets a random number included the signal being transmitted by a transmitter, by multiplying the same random number by the frequency-domain signal converted by the FFT module 120. The depermutation module 140 depermutates to collect, by the burst, the signal transmitted on the respectively different sub-carriers. The signal collected by the burst is input to the ranging controller 150.

Hereinafter, the ranging controller 150 that controls the ranging of the terminal, being included in the base station of the wireless communication system, will be described in greater detail according to an embodiment of the present invention.

The ranging controller 150 receives signals from a plurality of terminals, estimates phase change of pilots included in the signals transmitted from a certain terminal by unit of burst, removes noise by averaging the estimated phase changes, and compares the average phase change with a threshold value, thereby controlling the ranging of the terminal.

Referring to FIG. 2, in detail, the ranging controller 150 comprises a phase change estimation unit 210, an average unit 220, and a determination unit 230.

The phase change estimation unit 210 estimates the phase change with respect to all the terminals. To be more specific, the ranging controller 150 controls the ranging of each terminal by estimating the phase change with the signal of each terminal. Since the ranging control for the respective terminals is performed in the same manner, the method of ranging control will be described in regard to any one terminal among the plurality of terminals.

The phase change estimation unit 210 estimates the phase change using the pilots included in the signal being output from the depermutation module 140 by unit of burst. The phase is changed in the frequency-domain signal when time delay of the signals received by the base station occurs. In case 10 samples of time delay occur in the received signal, for example, the phase change is generated in consecutive sub-carriers as expressed by [Equation 1] as follows:

$$\theta = 2 \times \pi \times 10/1024 \qquad \text{[Equation 1]}$$

wherein, 1024, which is a variable value, refers to the number of the sub-carriers transmitting the signals.

In addition, for example, when the Partial Usage of Sub-Channels (PUSC) mode is used on the uplink channel of the communication system, each burst includes a plurality of sub-channels, each sub-channel includes 6 tiles, each tile includes 4 pilots, and the pilots are distanced by 3 sub-carriers respectively in the same symbol. Thus, the phase change can be expressed by [Equation 2] as follows:

$$\theta = 2 \times \pi \times 10 \times 3/1024 \qquad \text{[Equation 2]}$$

When the communication system applies the PUSC mode of the uplink channel, the transmission signal is structured as shown in FIG. 3. More specifically, each channel includes 6 tiles, and each tile includes 4 pilots. To illustrate the respective tiles in greater detail, FIG. 4 shows the structure of tile 'i'.

Tile 'i' comprises 4 pilots, that is, $P_{i,1}$, $P_{i,2}$, $P_{i,3}$, and $P_{i,4}$. Two pilots in one OFDMA symbol are distanced by 3 sub-carriers from each other.

In this case, the phase change estimation unit 210 performs the estimation of phase change by [Equation 3] as follows:

$$\theta = \frac{1}{3}\arctan\left(\sum_{k=0}^{K-1}\sum_{i=0}^{5}(P_{k,i,1}\times P^*_{k,i,3} + P_{k,i,2}\times P^*_{k,i,4})\right) \quad \text{[Equation 3]}$$

wherein, 'k' refers to the index of sub-channels included in one burst, 'K' refers to the number of sub-channels included in one burst, and 'i' refers to the index of tiles included in one sub-channel. Here, one sub-channel includes 6 tiles.

When the phase change is estimated and output by unit of burst by the phase change estimation unit 210, the average unit 220 averages the estimated phase changes because the output value may not be accurate when the received signal includes much noise. Therefore, the average unit 220 averages the phase changes to remove the noise, using [Equation 4] as follows:

$$\theta_{avg} = (1-\alpha)\theta_{avg} + \alpha\theta \quad \text{[Equation 4]}$$

wherein, $\theta_{avg}$ refers to the average of the phase changes, and '$\alpha$' refers to an average coefficient.

When the average unit 220 outputs the average phase change $\theta_{avg}$, the determination unit 230 controls the ranging of the terminal by comparing the average phase change $\theta_{avg}$ to a predetermined threshold value $\theta_{th}$. The threshold value $\theta_{th}$ is a reference value for determining whether the periodic ranging of the terminal is required for the reception delay.

More particularly, when the average phase change $\theta_{avg}$ is smaller than the pre-determined threshold value $\theta_{th}$, the determination unit 230 controls the terminal to initiate the periodic ranging.

Additionally, the determination unit 230 initializes the average phase change $\theta_{avg}$ to a value greater than the threshold value $\theta_{th}$. Although the periodic ranging is initiated by the terminal, the determination unit 230 performs such initialization FIG. 5 illustrates a method for the base station to control the ranging of the terminal in the wireless communication system, according to the embodiment of the present invention.

In FIG. 5, the phase change is estimated by unit of burst with respect to the signal including pilots (S510). Since the estimation of phase change is performed as already described regarding the phase change estimation unit 210, detailed description thereof will be omitted.

When the phase change is estimated by unit of burst, the average of the phase changes for the respective bursts is obtained to thereby remove the noise included in the signal (S520).

When the average phase change is smaller than the predetermined threshold value (S530), the terminal is controlled to initiate the periodic ranging with respect to the corresponding burst (S540). Here, the threshold value is the reference for determining whether performing the periodic ranging due to the time delay of the signals received by the base station.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. An apparatus for controlling ranging of a terminal in a wireless communication system, comprising:
    a Radio Frequency (RF) module for converting RF band signal received via antenna to low-frequency band signal;
    a Fast Fourier Transform (RF) module for converting the time-domain low-frequency band signal to a frequency-domain signal;
    a derandomizer for offsetting a random number included in the signal being transmitted by the terminal, with respect to the frequency-domain signal;
    a depermutation module for combining the frequency-domain signal output from the derandomizer by unit of burst and outputting the combined signals; and
    a ranging controller for controlling periodic ranging of the terminals corresponding to the respective bursts by estimating phase change in the frequency-domain signal of burst unit.

2. The apparatus of claim 1, wherein the ranging controller controls the periodic ranging of the terminal corresponding to the burst, by estimating phase change of pilots included in the frequency-domain signal of burst unit, by unit of burst, averaging the estimated phase changes, and comparing the average phase change with a threshold value for determining the periodic ranging of the terminal.

3. The apparatus of claim 1, wherein the wireless communication system is a communication system supporting Orthogonal Frequency Division Multiplexing/Orthogonal Frequency Division Multiplexing (OFDM/OFMDA).

4. The apparatus of claim 1, wherein the wireless communication system is a communication system supporting Institute of Electric and Electronics Engineers (IEEE) 802.16d/e standard.

5. The apparatus of claim 1, wherein the wireless communication system is a communication system supporting Wireless Broadband Internet/Worldwide Interoperability for Microwave Access (WiBro/WiMAX).

6. A method for controlling ranging of a terminal in a wireless communication system, comprising steps of:
    receiving signal from a plurality of terminals and converting the received RF band signal to low-frequency band signal;
    converting the time-domain signal of the low frequency band to frequency-domain signal;
    offsetting a random number included in signal being transmitted by the terminal, with respect to the frequency-domain signal;
    combining the frequency-domain signal in which the random number is offset, by unit of burst; and
    controlling periodic ranging of the terminal corresponding to the respective burst by estimating phase change in the frequency-domain signals of burst unit.

7. The method of claim 6, wherein the controlling step comprises steps of:
    estimating the phase change of pilots included in the frequency-domain signal of burst unit;
    averaging the estimated phase change; and
    controlling periodic ranging of the terminal corresponding to the burst by comparing the average phase change with a threshold value for determining the periodic ranging.

8. The method of claim 6, wherein the wireless communication system is a communication system supporting OFDM/OFMDA.

9. The method of claim 6, wherein the wireless communication system is a communication system supporting IEEE 802.16d/e standard.

10. The method of claim 6, wherein the wireless communication system is a communication system supporting WiBro/WiMAX.

11. An apparatus for controlling periodic ranging of a terminal using a signal converted in the frequency-domain signal and combined by unit of burst from a plurality of terminals in a wireless communication system, comprising:
   a phase change estimation unit for estimating phase change using pilots included in the frequency-domain signal being input by unit of burst;
   an average unit for calculating an average of the phase change; and
   a determination unit for controlling periodic ranging of the terminal corresponding to the burst by comparing the average phase change with a threshold value for determining the periodic ranging.

12. The apparatus of claim 11, wherein the determination unit instructs the terminal corresponding to the burst to initiate the periodic ranging when the average phase change is smaller than the threshold value.

13. The apparatus of claim 1, wherein the determination unit initializes the average phase change to a value greater than the threshold value.

14. The apparatus of claim 13, wherein, in the frequency-domain signals being input by unit of burst, the phase change estimation unit estimates the phase by conjugation-multiplying pairs of pilots distanced by a predetermined number of sub-carriers respectively, using a plurality of sub-channels included in the burst, a plurality of tile included in each sub-channel, and pilots included in each tile, obtaining an arctan value by adding the conjugation-multiplied values by the tiles, for a sub-channels, and dividing the arctan value by a value corresponding to difference of sub-carrier position between two pilots constituting the respective pilot pairs.

15. A method for controlling periodic ranging of a terminal using a signal converted to the frequency-domain signal and combined by unit of burst from a plurality of terminals in a wireless communication system, comprising steps of:
   estimating phase change using pilots included in the frequency-domain signal being input by unit of burst;
   calculating an average of the phase change; and
   controlling periodic ranging of the terminal corresponding to the burst by comparing the average phase change with a threshold value for determining the periodic ranging.

16. The method of claim 15, wherein the controlling step instructs the terminal corresponding to the burst to initiate the periodic ranging when the average phase change is smaller than the threshold value.

17. The method of claim 15, wherein the controlling step initializes the average phase change to a value greater than the threshold value.

18. The method of claim 17, wherein the estimating step estimates the phase change by conjugation-multiplying pairs of pilots distanced by a predetermined number of sub-carriers in the frequency-domain signal being input by unit of burst respectively, using a plurality of sub-channels included in the burst, a plurality of tile included in each sub-channel, and pilots included in each tile, obtaining an arctan value by adding the conjugation-multiplied values by the tile, for a sub-channels, and dividing the arctan value by a value corresponding to difference of sub-carrier position between two pilots constituting the respective pilot pairs.

19. A method for controlling periodic ranging of a terminal in a wireless communication system supporting OFDM/OFDMA, comprising steps of:
   estimating phase change using pilots of received signals;
   determining whether to initiate the periodic ranging of the terminal according to the estimated phase change; and
   transmitting a signal corresponding to the determination result.

20. The method of claim 19, wherein the determining step comprises steps of:
   calculating an average of the phase change; and
   comparing the average phase change with a threshold value for determining necessity of the periodic ranging of the terminal.

* * * * *